United States Patent Office 3,330,776
Patented July 11, 1967

3,330,776
TRICHLOROTRIFLUOROETHANE HEXA-
FLUOROPROPANOL COMPOSITION
David G. Coe, Chadds Ford, Pa., and Edward James Bennett, Newark, Del., assignors to E. I. du Pont de Nemours and Company, Wilmington, Del., a corporation of Delaware
No Drawing. Filed Dec. 8, 1964, Ser. No. 416,879
2 Claims. (Cl. 252—364)

The present invention is directed to a novel constant boiling point mixture of trichlorotrifluoroethane and 1,1,1,3,3,3-hexafluoroisopropanol and an azeotrope of these two compounds. These unique mixtures are useful solvents having unexpected properties as solvents for polymers.

Hexafluoroisopropanol is a known alcohol prepared by reduction of hexafluoroacetone as disclosed in Belgium Patent 634,368. It is known to be a useful solvent for polymers as set forth, for example, in U.S. Patent 3,153,004 but is somewhat expensive. Solvents for polymers have many potential uses industrially as will be indicated hereinafter.

It is, accordingly, an object of this invention to provide a novel solvent combination containing hexafluoroisopropanol which is less expensive than hexafluoropropanol and which increases the solvent efficiency of hexafluoropropanol.

These and other objects of the invention will become apparent from the following description and claims.

More specifically, the present invention is directed to a substantially constant boiling composition consisting essentially of 60–80% by weight 1,1,2-trichlorotrifluoroethane and 40–20% by weight 1,1,1,3,3,3-hexafluoropropanol, the sum of the two compounds being 100%.

The present invention also relates to a minimum boiling azeotrope consisting essentially of 68% by weight 1,1,2-trichlorotrifluoroethane and 32% by weight 1,1,1-3,3,3-hexafluoroisopropanol having a boiling point of 41.60° C. at 760 mm. pressure.

Mixtures of 1,1,2-trichlorotrifluoroethane and hexafluoroisopropanol containing from 20–40% by weight of the latter having essentially constant boiling points. This is demonstrated by heating various mixtures under total reflux until an equilibrium temperature is reached. The results of such measurements are shown in Table I and demonstrate not only the essentially constant boiling points of 41.60–41.69° C. at 760 mm., but also the minimum boiling azeotrope containing 32% hexafluoroisopropanol boiling at 41.60° C.

TABLE I.—BOILING POINTS OF MIXTURES

| Weight Percent | | Boiling Point, ° C./760 mm. |
|---|---|---|
| $CCl_2FCClF_2$ | $(CF_3)_2CHOH$ | |
| 100 | 0 | 47.57 |
| 80 | 20 | 41.69 |
| 68 | 32 | 41.60 |
| 60 | 40 | 41.67 |
| 40 | 60 | 45.01 |
| 20 | 80 | 51.3 |
| 0 | 100 | 58.3 |

Evaporation of such mixtures containing 20–40% hexafluoroisopropanol lead to little if any change in composition of the unevaporated liquid. This is a very desirable property in mixed solvents since it permits easy recovery and prevents changes in the solvent power of the mixture when evaporation occurs.

As indicated heretofore, hexafluoroisopropanol is known to be a useful solvent for polymers. Trichlorotrifluoroethane is also known to be a solvent, but not generally for polymers. It has now been found that mixtures of trichlorotrifluoroethane and hexafluoroisopropanol are better solvents than either component alone. This is indicated by the Kauri-Butanol No. of the mixtures compared to the components as shown in Table II. The Kauri-Butanol Nos. are determined by ASTM Method D-1133-54T.

TABLE II

| Weight Percent | | Kauri-Butanol Number |
|---|---|---|
| $CF_2ClCFCl_2$ | $(CF_3)_2CHOH$ | |
| 100 | 0 | 31 |
| 80 | 20 | 74 |
| 68 | 32 | 76.5 |
| 60 | 40 | 68 |
| 40 | 60 | 40 |
| 20 | 80 | 27 |
| 0 | 100 | 19 |

It has also been found that mixtures of trichlorotrifluoroethane and hexafluoroisopropanol are excellent solvents for polymers. For example, hexafluoroisopropanol is a good solvent for polyethylene terephthalate. It has been found that dilution of hexafluoroisopropanol with trichlorotrifluoroethane actually increases the amount of polymer dissolved per unit weight of hexafluoroisopropanol. This is shown in Table III.

TABLE III.—SOLUBILITY OF POLYETHYLENE TEREPHTHALATE IN COMPOSITION—ROOM TEMPERATURE

| | $CF_2ClCFCl_2$ | $(CF_3)_2CHOH$ | 24% $(CF_3)_2CHOH$ 76% $CF_2ClCFCl_2$ |
|---|---|---|---|
| Gms. Polymer/100 gms. solvent | 0 | 18 | 11 |
| Gms. Polymer/100 gms. $(CF_3)_2CHOH$ | | 18 | 46 |

Similar results are obtained for mixtures containing 36% hexafluoroisopropanol. While the mixture does not dissolve as much of the polyethylene terephthalate per unit weight of the mixed solvent as hexafluoroisopropanol itself, the solvent mixture dissolves about 2.5 times as much polymer per unit weight of hexafluoroisopropanol present in the mixture as does hexafluoroisopropanol itself. Thus, by diluting the more expensive hexafluoroisopropanol with the less expensive trichlorotrifluoroethane, it is possible to actually increase the solvent efficiency of hexafluoroisopropanol. This is completely unexpected since trichlorotrifluoroethane itself is shown in Table III to completely lack solvent power for the polymer. The solutions of this polymer may be used for spinning fibers, cements, for coating surfaces and the like. The solvent mixture may also be used as a stripping agent for the polymer.

The mixtures of trichlorofluoroethane and hexafluoroisopropanol are also useful for dissolving polystyrene as is shown in Table IV.

TABLE IV.—SOLUBILITY OF POLYSTYRENE IN COMPOSITIONS—35° C.

|  | $CF_2ClCFCl_2$ | $(CF_3)_2CHOH$ | 36% $(CF_3)_2CHOH$ 64% $CF_2ClCFCl_2$ |
| --- | --- | --- | --- |
| Gms./100 gms. solvent | <2 | 11 | 23 |
| Gms./100 gms. $(CF_3)_2CHOH$ |  | 11 | 64 |

Similar results are obtained for mixtures containing 24% hexafluoroisopropanol. In this case, not only does the mixture itself dissolve about six times as much polymer per unit weight of hexafluoroisopropanol as does hexafluoroisopropanol itself, but also the solvent mixture is a better solvent by a factor of 2 than hexafluoroisopropanol itself. Again, this was quite unexpected since trichlorotrifluoroethane is, as indicated in Table IV, a very poor solvent for polystyrene. The polystyrene solutions are useful as cements, for coating surfaces, for preparing foams for evaporation of the solvent and the like. It also is useful as a stripping agent for polystyrene.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A substantially constant boiling composition consisting essentially of 60–80% by weight 1,1,2-trichlorotrifluoroethane and 40–20% by weight 1,1,1,3,3,3-hexafluoropropanol.

2. A minimum boiling azeotrope consisting essentially of 68% by weight 1,1,2-trichlorotrifluoroethane and 32% by weight 1,1,1,3,3,3-hexafluoroisopropanol having a boiling point of 41.60° C. at 760 mm. pressure.

References Cited

UNITED STATES PATENTS

| 2,999,817 | 9/1961 | Bower | 252—364 X |
| 3,042,479 | 7/1962 | Lawrence et al. | 252—171 X |
| 3,153,004 | 10/1964 | Middleton | 260—33.4 |

FOREIGN PATENTS

| 634,368 | 7/1962 | Belgian. |

LEON D. ROSDOL, *Primary Examiner.*

J. T. FEDIGAN, *Examiner.*